United States Patent
Pettersson et al.

(10) Patent No.: US 9,327,719 B2
(45) Date of Patent: May 3, 2016

(54) METHOD FOR BRAKING A VEHICLE (71) Applicant: Scania CV AB, Södertälje (SE)

(72) Inventors: Niklas Pettersson, Stockholm (SE);
Mikael Bergquist, Huddinge (SE);
Johan Lindström, Nyköping (SE);
Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/410,604

(22) PCT Filed: Jun. 26, 2013

(86) PCT No.: PCT/SE2013/050791
§ 371 (c)(1),
(2) Date: Dec. 23, 2014

(87) PCT Pub. No.: WO2014/003671
PCT Pub. Date: Jan. 3, 2014

(65) Prior Publication Data
US 2015/0148187 A1 May 28, 2015

(30) Foreign Application Priority Data

Jun. 27, 2012 (SE) ...................................... 1250698

(51) Int. Cl.
*B60W 10/115* (2012.01)
*B60W 20/00* (2006.01)
(Continued)

(52) U.S. Cl.
CPC .............. *B60W 20/108* (2013.01); *B60K 6/365* (2013.01); *B60K 6/48* (2013.01); *B60L 7/12* (2013.01); *B60L 11/14* (2013.01); *B60L 15/2009* (2013.01); *B60W 10/06* (2013.01); *B60W 10/08* (2013.01); *B60W 10/11* (2013.01); *B60W 10/115* (2013.01);
(Continued)

(58) Field of Classification Search
USPC .......................................................... 701/22
See application file for complete search history.

(56) References Cited

U.S. PATENT DOCUMENTS 4,018,316 A * 4/1977 McQuinn ................ F16H 45/00
192/113.36
4,702,341 A * 10/1987 Taga ................... B60K 23/0808
180/249

(Continued)

FOREIGN PATENT DOCUMENTS

EP 1 319 546 A1 6/2003

OTHER PUBLICATIONS

International Search Report mailed Nov. 15, 2013 in corresponding PCT International Application No. PCT/SE2013/050791.

*Primary Examiner* — Shelley Chen
(74) *Attorney, Agent, or Firm* — Ostrolenk Faber LLP (57) ABSTRACT

A method for braking a vehicle driving forward towards stop. The vehicle has a propulsion system including a combustion engine with an output shaft (2a), a gearbox (3) with an input shaft (3a), an electric machine (9) comprising a stator and a rotor, and a planetary gear comprising a sun gear (10), a ring gear (11) and a planet wheel carrier (12). When braking the vehicle, a reverse gear of the gearbox is engaged and the electric machine is controlled to apply brake torque requested to the input shaft of the gearbox.

18 Claims, 4 Drawing Sheets

(51) Int. Cl.
- B60K 6/365 (2007.10)
- B60W 10/08 (2006.01)
- B60W 10/11 (2012.01)
- B60L 7/12 (2006.01)
- B60L 11/14 (2006.01)
- B60L 15/20 (2006.01)
- B60K 6/48 (2007.10)
- B60W 30/18 (2012.01)
- B60W 10/06 (2006.01)

(52) U.S. Cl.
CPC ......... B60W 20/30 (2013.01); B60W 30/18127 (2013.01); *B60L 2240/12* (2013.01); *B60L 2240/423* (2013.01); *B60L 2240/441* (2013.01); *Y02T 10/642* (2013.01); *Y02T 10/70* (2013.01); *Y02T 10/7077* (2013.01); *Y02T 10/7275* (2013.01); *Y10S 903/93* (2013.01); *Y10T 477/24* (2015.01)

(56) References Cited

U.S. PATENT DOCUMENTS

| | | | | |
|---|---|---|---|---|
| 5,884,201 | A * | 3/1999 | Kawai | B60K 1/00 180/65.6 |
| 5,887,670 | A | 3/1999 | Tabata et al. | 180/65.2 |
| 2002/0063000 | A1 | 5/2002 | Kojima | 180/65.1 |
| 2002/0094899 | A1 | 7/2002 | Hamai | 475/5 |
| 2003/0062206 | A1 | 4/2003 | Fujikawa | 180/65.2 |
| 2003/0069103 | A1* | 4/2003 | Ibamoto | F16H 3/006 475/5 |
| 2004/0029683 | A1* | 2/2004 | Steen | B60K 6/485 477/115 |
| 2004/0116243 | A1* | 6/2004 | Ibamoto | F16H 61/0403 477/3 |
| 2004/0168841 | A1 | 9/2004 | Ohta et al. | 180/65.2 |
| 2006/0003863 | A1* | 1/2006 | Tabata | B60K 6/445 477/2 |
| 2006/0017414 | A1* | 1/2006 | Joe | B60K 6/445 318/432 |
| 2006/0142117 | A1* | 6/2006 | Colvin | B60K 6/365 477/107 |
| 2007/0087894 | A1* | 4/2007 | Tsuneyoshi | B60K 6/445 477/3 |
| 2007/0142168 | A1* | 6/2007 | DeMarco | B60W 30/194 477/41 |
| 2009/0134820 | A1* | 5/2009 | Sugiyama | B60K 6/445 318/66 |
| 2009/0164075 | A1* | 6/2009 | Ogasawara | F16H 61/12 701/54 |
| 2010/0044128 | A1* | 2/2010 | Oba | B60K 6/387 180/65.25 |
| 2010/0048338 | A1* | 2/2010 | Si | B60K 6/365 475/5 |
| 2010/0113213 | A1* | 5/2010 | Oba | B60K 6/445 477/5 |
| 2010/0173746 | A1 | 7/2010 | Ideshio et al. | 477/36 |
| 2010/0261565 | A1* | 10/2010 | Ai | B60K 6/445 475/5 |
| 2011/0245003 | A1* | 10/2011 | Takami | B60K 6/365 475/5 |
| 2012/0103749 | A1* | 5/2012 | Kimura | B60K 6/387 192/54.1 |
| 2012/0259492 | A1* | 10/2012 | Yamamoto | B60K 6/52 701/22 |
| 2012/0264553 | A1* | 10/2012 | Bucknor | B60K 6/365 475/5 |

* cited by examiner

METHOD FOR BRAKING A VEHICLE

CROSS-REFERENCE TO RELATED APPLICATIONS

The present application is a 35 U.S.C. §§371 National Phase conversion of PCT/SE2013/050791, filed Jun. 26, 2013, which claims priority of Swedish Patent Application No. 1250698-6, filed Jun. 27, 2012, the contents of which are incorporated by reference herein. The PCT International Application was published in the English language.

FIELD OF THE INVENTION AND PRIOR ART

The present invention relates to a method for braking a vehicle driving forward towards stopping.

The invention is especially but not exclusively directed to carrying out such a method for motor vehicles in the form of wheeled utility vehicles, especially heavy such vehicles, such as trucks and buses.

"Brake towards stop" means that the braking is carried out at comparatively low speeds of the vehicle, and when the method is started, there is an aim to bring the vehicle to stop, but it is not necessary that be done, but depending upon the actual circumstances, the method may be carried out so that the vehicle will not reach any position of standing still.

Accordingly, the invention relates to a method for braking a hybrid vehicle driving forward towards stop, in which such a vehicle is generally a vehicle which may be driven by a primary engine, here a combustion engine, and a secondary engine, here an electric machine. The electric machine is suitably provided with means for storing energy, such as a battery or a capacitor for storing electric energy, and regulating equipment for regulating the flow of electrical energy between the storing means and the electric machine. The electric machine may operate as a motor or a generator depending upon the state of operation of the vehicle. When the vehicle is braked, the electric machine generates electrical energy which may be stored, and the electrical energy stored may later be utilized for, for example, driving the vehicle.

The utilization of a conventional clutch mechanism disconnecting the input shaft of the gearbox with respect to the combustion engine during the gearchanging process in the gearbox results in disadvantages, such as heating of the discs of the clutch mechanism, which results in an increased fuel consumption and wear of the clutch discs. Considerable losses are then also caused when starting the vehicle. Furthermore, a conventional clutch mechanism is comparatively heavy and costly. It requires also a comparatively large space in the vehicle. Friction losses are also created when using a hydraulic converter/torque transformer usually used in automatic gearboxes. The conventional clutch mechanism and said disadvantages associated therewith may be avoided by providing the vehicle with a propulsion system in which the output shaft of the combustion engine, the rotor of the electric machine and the input shaft of the gearbox are interconnected by a planetary gear. A vehicle having a propulsion system of this type is known through EP 1 319 546.

There is of course an ongoing attempt to improve the way to drive a vehicle having such a propulsion system with respect to energy efficiency and to regenerate as much as possible of the brake energy when braking the vehicle.

SUMMARY OF THE INVENTION

The object of the present invention is to provide a method of the type defined in the introduction.

By utilizing the possibility of a vehicle having a propulsion system according to the invention to engage a reverse gear when driving forward, braking advantageous from the energy regenerating point of view may be carried out. It attempts to change gear as few times as possible during braking and braking by the electric machine with full electric machine torque for the existing rotational speed of the rotor of the electric machine for regenerating maximum brake energy when braking a vehicle of this type. The method according to the invention makes it possible to brake by means of the electric machine during the entire braking procedure until the vehicle stands still, if the method is continued until standstill, with full electric machine torque for the existing rotational speed of the rotor of the electric machine and without carrying out any further gearchange than from the forward gear to the reverse gear. If a forward gear had instead been chosen during the braking, the combustion engine would get an increased rotational speed when a higher brake torque is created by the electric machine.

According to an embodiment of the invention the method is carried out for a vehicle having a propulsion system with the sun gear as the first component and the ring gear as the third component, and such a propulsion system is described in unpublished SE 1051384-4. It has a number of advantages with respect to a propulsion system according to EP 1 319 546 mentioned above, which has the ring gear as the first component and the sun gear as the third component. A compact construction which is easy to build in spaces already existing for drivetrains (propulsion systems) having clutch mechanisms instead of planetary gears is obtained by connecting the electric machine with the ring gear and connecting the output shaft of the combustion engine with the sun gear. A hybridized gearbox may by this be made size and weight compatible with a standard gearbox, and standardized interfaces may be maintained. This means that the weight increase normally associated with a hybridization may be reduced considerably. Another advantage is that connection of the electric machine with the ring gear means a higher possible brake torque through this than if the machine is instead connected to the sun gear. Thus, the planet wheel carrier is in this embodiment connected to the input shaft of the gearbox, and to engage the reverse gear when braking regeneratively while driving forward does then work well. The electric machine is according to a further embodiment connected to the sungear, the output shaft of the combustion engine is connected to the ring gear and the input shaft of the gearbox is connected to the planet wheel carrier. But this method could also function for other combinations of first, second and third components than the one of this embodiment.

According to another embodiment of the invention the method is carried out for a vehicle with a propulsion system comprising a range gear, and according to another embodiment of the invention being a further development of the preceding one, before carrying out the steps, ensure that a high range gear is engaged. The utilization of the gear combination of reverse gear and high range gear normally not used in vehicles of this type makes it possible to start the method according to the invention for braking a vehicle having a considerably higher speed than would be enabled if the low range gear were engaged. However, it is pointed out that it is well possible to carry out the method according to the invention with the low range gear engaged in the case the speed of the vehicle is sufficiently low when it is desired to brake the vehicle towards stop.

According to another embodiment of the invention, a step of checking brake torque is carried out repeatedly or continuously while carrying out a step of controlling the electric machine to apply brake torque, and the rotational speed of the output shaft of the combustion engine is controlled towards a predetermined rotational speed of the combustion engine as long as the checking indicates that brake torque is requested. The output shaft of the combustion engine is then advantageously controlled towards a predetermined rotational speed, preferably in the form of a low rotational speed, such as a so-called idle rotational speed, of the combustion engine. The fuel consumption of the combustion engine is by this kept at a low level during the braking.

According to another embodiment of the invention, the above noted steps are carried out repeatedly or continuously and, as long as the checking indicates that brake torque is requested, the combustion engine is controlled to deliver a rotational speed of the output shaft thereof which is so dependent on the rotational speed of the rotor of the electric machine that the electric machine is controllable to brake the input shaft of the gearbox while generating a maximum electric regenerative power. This ensures such control of the combustion engine that the rotor of the electric machine will, during the entire braking procedure, rotate with a sufficiently high rotational speed for enabling a maximum electric regenerative power to be generated in the electric machine.

According to another embodiment of the invention the fuel injection in the combustion engine is stopped while controlling the electric machine to apply brake torque and when the output shaft of the combustion engine has substantially stopped this shaft is locked against rotation, and the controlling step is continued with the combustion engine turned off. Locking of the output shaft of the combustion engine against rotation may be accomplished by a controllable brake for which the torque may be controlled, a spring loaded brake having a fixed brake torque or any type of locking pin able to lock the flywheel of the engine. The brake may act upon the flywheel of the combustion engine, upon the shaft to the planetary gear or upon the sun gear of the planetary gear. Accordingly, it is after that changed to purely electrical driving. This means a favorable state of the propulsion system for driving away or a short acceleration which may then be carried out with full torque of the electric machine changed up through the planetary gear.

According to another embodiment of the invention the checking and controlling are performed, and when the checking shows that instead of a brake torque, an acceleration torque of the propulsion system is requested and if the acceleration torque is less than the product of the torque needed for driving the combustion engine to rotate and of the transmission ratio of the planetary gear the electric machine is controlled to reverse the direction of the torque applied to the input shaft of the gearbox through the third component so as to apply the requested acceleration torque to this shaft. When such a low acceleration torque is suddenly requested during the braking procedure according to the present invention, this may easily be obtained by the control of the electric machine. This may for example be the case if a bus brakes for stopping at a bus stop but the driver just before the bus stops estimates that it would be better to drive the bus a little bit further than previously intended, for example since another bus has suddenly driven away. Thus, no gear-change that would be negative from the power consumption/regenerating point of view would be required in such a case.

According to another embodiment of the invention when the checking and controlling steps are carried out repeatedly or continuously, and when the checking shows that instead of a brake torque, an acceleration torque of the propulsion system is requested and the acceleration torque is less than the product of the torque needed for driving the combustion engine to rotate and the transmission ratio of the planetary gear the electric machine or the electric machine and the combustion engine is/are controlled so that it/they through the input shaft of the gearbox gives/give a state of zero torque in the gearbox, whereupon the reverse gear is disengaged, the electric machine and/or combustion engine is/are controlled so that the rotational speed of the third component together with the rotational speed of the output shaft of the combustion engine give the input shaft of the gearbox a rotational speed which for the existing speed of the vehicle is synchronized with the shaft rotational speed for a forward gear of the gearbox and the forward gear of the gearbox is then engaged. This procedure may be chosen when there is a desire to continue to accelerate the vehicle.

According to another embodiment of the invention the checking and controlling steps are carried out repeatedly or continuously, and when the checking shows that instead of a brake torque, an acceleration torque of the propulsion system is requested and the acceleration torque is larger than the product of the torque needed for driving the combustion engine to rotate and the transmission ratio of the planetary gear, the electric machine or the electric machine and the combustion engine is/are controlled so that it/they through the input shaft of the gearbox gives/give a state of zero torque in the gearbox, whereupon the reverse gear is disengaged, the electric machine and/or combustion engine is/are controlled so that the rotational speed of the third component together with the rotational speed of the output shaft of the combustion engine give the input shaft of the gearbox a rotational speed which, for the existing speed of the vehicle, is synchronized with the shaft rotational speed for a forward gear of the gearbox and the forward gear of the gearbox is then engaged.

The method according to the invention may in this way be terminated and left, whereupon the locking means may if desired be moved to the locking position if the electric machine and the combustion engine are firstly controlled so that the first and third components get the same rotational speed as the input shaft of the gearbox.

According to another embodiment of the invention obtaining a zero torque comprises calculation of the rotational speed by which the input shaft of the gearbox is to be driven for a state of zero torque between the components interlocked by the locking means for the existing speed of the vehicle and the gear engaged in the gearbox and calculations of the rotational speeds of the output shaft of the combustion engine and the rotor of the electric machine required for obtaining this state are performed.

According to another embodiment of the invention calculation of the rotational speed by which the input shaft of the gearbox is to be driven for a state of zero torque in the gearbox for the existing speed of the vehicle and gear engaged in the gearbox as well as a calculation of the rotational speeds of the output shaft of the combustion engine and the rotor of the electric machine required for obtaining this state are performed.

According to another embodiment of the invention, a step of calculation is performed of the rotational speed which the input shaft of the gearbox would get if, for the existing speed of the vehicle, the reverse gear of the gearbox would be engaged as well as a calculation of the rotational speed of the ring gear and the rotational speed of the output shaft of the combustion engine which together would give the input shaft of the gearbox the rotational speed calculated for the reverse gear engaged.

According to a further development of the embodiment mentioned above relating to the dependence of the rotational speed of the output shaft of the combustion engine on the rotational speed of the rotor of the electric machine, the step of controlling the electric machine to apply a brake torque comprises calculation of the rotational speed to be assumed by the output shaft of the combustion engine for thereby giving the electric machine a rotational speed enabling it to brake while generating a maximum regenerative power.

The invention also relates to a computer program and a computer program product, an electronic control unit and a vehicle configured to cause performance of the method.

Other advantageous features and advantages of the invention appear from the description following below.

BRIEF DESCRIPTION OF THE DRAWINGS

With reference to the appended drawings, below follows a description of an embodiment of the invention cited as an example.

In the drawings.

DETAILED DESCRIPTION OF EMBODIMENTS OF THE INVENTION

Figure 1:
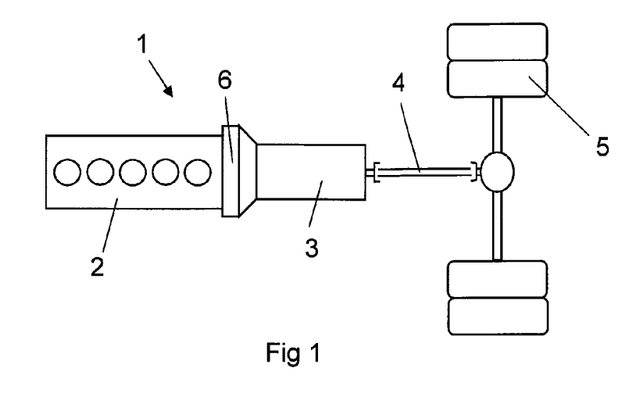
FIG. 1 is a very simplified view of a drivetrain of a vehicle for which a method according to the invention may be carried out.
Figure 2:
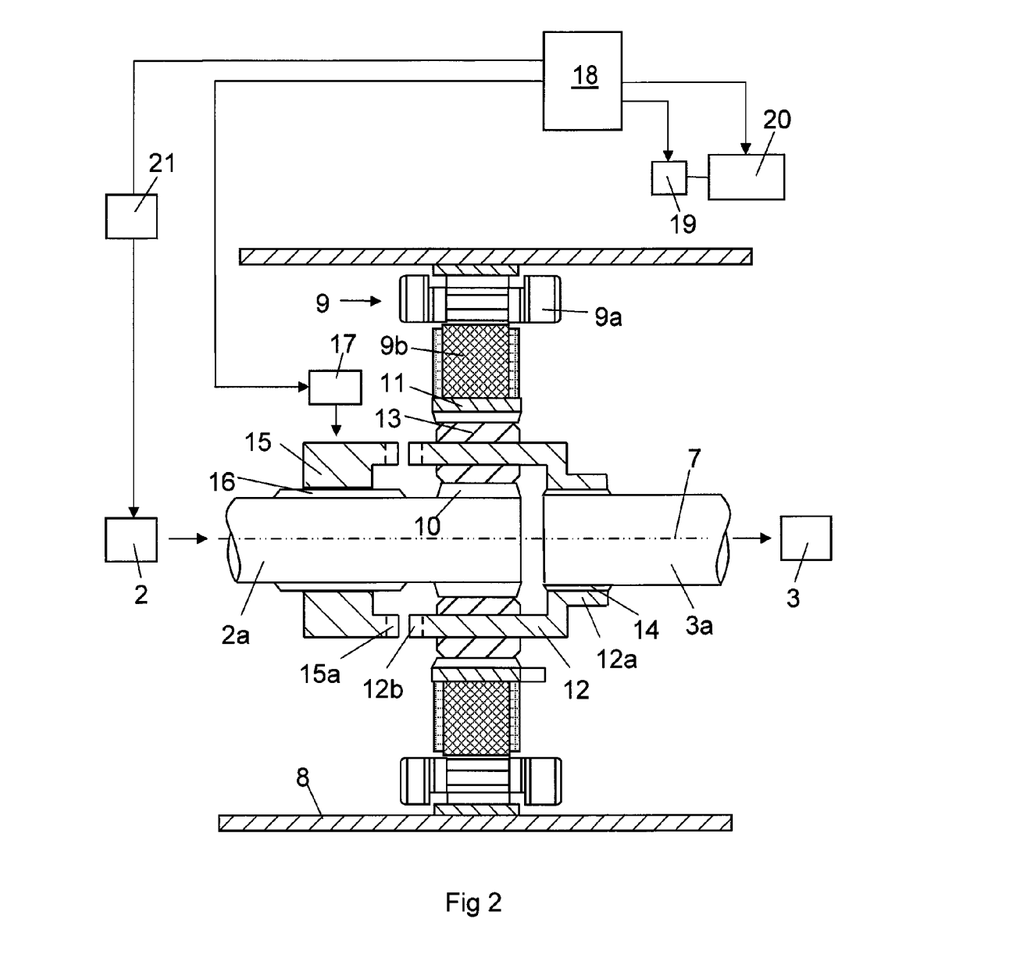
FIG. 2 is a still simplified but more detailed view of a part of a said propulsion system.

FIG. 1 shows a drivetrain for a heavy vehicle 1. The drivetrain comprises a combustion engine 2, a gearbox 3, a number of drive shafts 4 and drive wheels 5. The drivetrain has between the combustion engine 2 and the gearbox 3 an intermediate portion 6. FIG. 2 shows more in detail the components in the intermediate portion 6. The combustion engine 2 is provided with an output shaft 2a and the gearbox 3 with an input shaft 3a in the intermediate portion 6. The output shaft 2a of the combustion engine is arranged coaxially with respect to the input shaft 3a of the gearbox. The output shaft 2a of the combustion engine and the input shaft 3a of the gearbox are arranged to rotate around a rotation axis 7 in common. The intermediate portion 6 comprises a housing 8 enclosing an electric machine 9 and a planetary gear. The electric machine 9 comprises as usual a stator 9a and a rotor 9b. The stator 9a comprises a stator core secured in a suitable way on the inner side of the housing 8. The stator core comprises stator windings. The electric machine 9 is adapted to, in certain operation situations, utilize electric energy stored for supplying drive power to the input shaft 3a of the gearbox and, in other operation situations, utilize kinetic energy of the input shaft 3 of the gearbox for generating and storing electric energy.

The planetary gear is arranged substantially radially internally of the stator 9a and the rotor 9b of the electric machine. The planetary gear comprises as usual a sun gear 10, a ring gear 11 and a planet wheel carrier 12. The planet wheel carrier 12 carries a number of gear wheels 13 rotatably arranged in a radial space between the teeth of the sun gear 10 and the ring gear 11. The sun gear 10 is secured to a circumferential surface of the output shaft 2a of the combustion engine. The sun gear 10 and the output shaft 2a of the combustion engine rotate as a unit with a first rotational speed $n_1$. The planet wheel carrier 12 comprises a fastening portion 12a being fastened to a circumferential surface of the input shaft 3a of the gearbox by means of a splined connection 14. The planet wheel carrier 12 and the input shaft 3a of the gearbox may by means of this connection rotate as a unit with a second rotational speed $n_2$. The ring gear 11 comprises an external circumferential surface onto which the rotor 9b is secured. The rotor 9b and the ring gear 11 form a rotatable unit rotating with a third rotational speed $n_3$.

The propulsion system comprises a locking means by the fact that the output shaft 2a of the combustion engine is provided with a displaceable coupling member 15. The coupling member 15 is fastened to the output shaft 2a of the combustion engine by means of a splined connection 16. The coupling member 15 is in this case fixed against rotation to the output shaft 2a of the combustion engine and displaceable in the axial direction on the output shaft 2a of the combustion engine. The coupling member 15 comprises a coupling portion 15a connectable to a coupling portion 12b of the planet wheel carrier 12. A displacing member 17 schematically shown is adapted to displace the coupling member 15 between a first position in which the coupling portion 15a, 12b are not mutually engaged corresponding to a releasing position of the locking means and a second position in which the coupling portions 15a, 12b are mutually engaged corresponding to a locking position of the locking means. The output shaft 2a of the combustion engine and the input shaft 3a of the gearbox will in this locking position be interlocked and these and the rotor of the electric machine will by that rotate with the same rotational speed. This state may be called locked planet. The locking mechanism may also comprise a sleeve provided with first splines which in the releasing position engage second splines on a first component of the planetary gear and in the locking position engage third splines on a second component of the planetary gear. The first component is in this case preferably the planet wheel carrier and a second component the sun gear. The locking mechanism may then be designed as a sleeve with a ring shape enclosing the planet wheel carrier substantially concentrically.

An electric control unit 18 is designed to control the displacing member 17. The control unit 18 is also configured to decide on which occasions the electric machine shall operate as a motor and on which occasions it shall operate as a generator. For deciding this the control unit 18 may receive current information about suitable operation parameters. The control unit 18 may be a computer with software for this task. The control unit 18 controls regulating equipment 19 schematically shown, which regulates the flow of electric energy between a hybrid battery 20 and the stator windings 9a of the electric machine. On occasions when the electric machine 9 operates as a motor, electric energy stored is supplied from the hybrid battery 20 to the stator 9a. On occasions when the electric machine operates as a generator, electric energy is supplied from the stator 9a to the hybrid battery 20. The hybrid battery 20 delivers and stores electric energy with a voltage on the order of 200-800 volts. Since the intermediate portion 6 between the combustion engine 2 and the gearbox 3 in a vehicle is restricted, it is required that the electric machine 9 and the planetary gear constitute a compact unit. The components 10, 11, 12 of the planetary gear are here arranged substantially radially internally of the stator 9a of the electric machine. The rotor 9b of the electric machine, the ring gear 11 of the planetary gear, the output shaft 2a of the combustion engine and the input shaft 3a of the gearbox are here arranged to rotate around a rotation axis 7 in common. The electric machine 9 and the planetary gear occupy through such a design a comparatively small space. The vehicle 1 is provided with a motor control function 21 through which the rotational speed $n_1$ of the combustion engine 2 may be regulated. The control unit 18 has by that a possibility to activate the motor control function 21 and create a state of zero torque in the gearbox when gears in the gearbox 3 are engaged and disengaged. The propulsion system may of course instead of being controlled by one single control unit 18 be controlled by several different control units.

Figure 4:
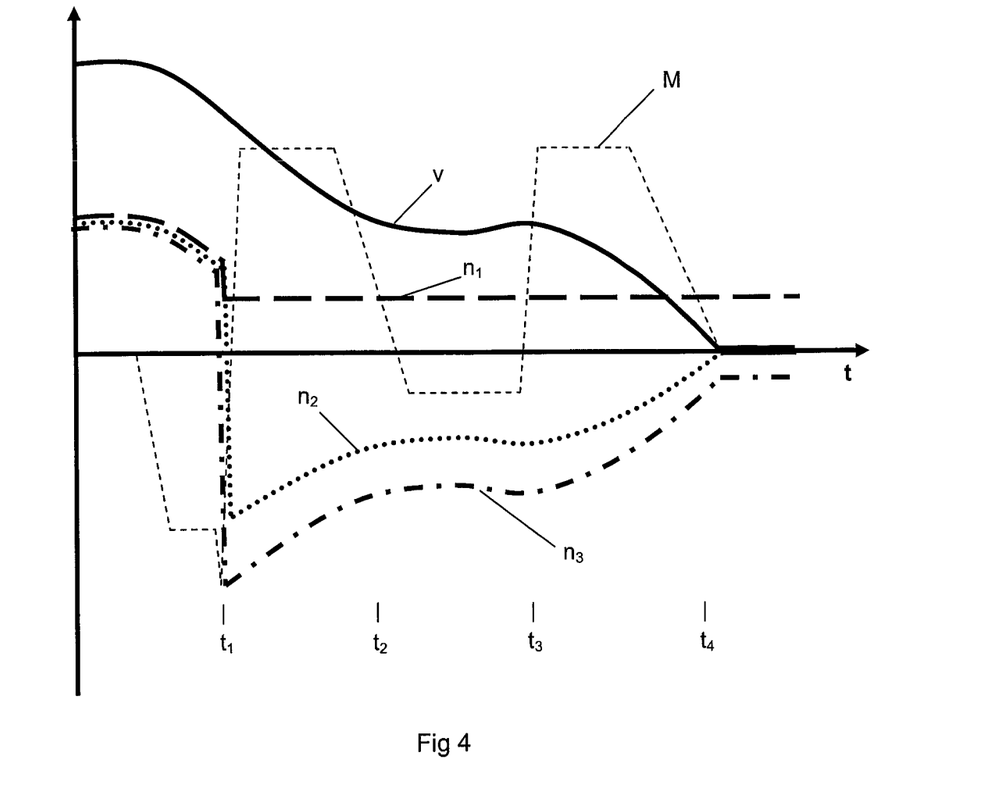
FIG. 4 shows how the rotational speed for the members (shaft of combustion engine, rotor of electric machine and input shaft to the gearbox) connected to the planetary gear of the propulsion system according to FIG. 2 as well as vehicle speed and torque of the electric machine vary over time when carrying out a method according to an embodiment of the invention for braking the vehicle driving forward towards stop.
Figure 5:
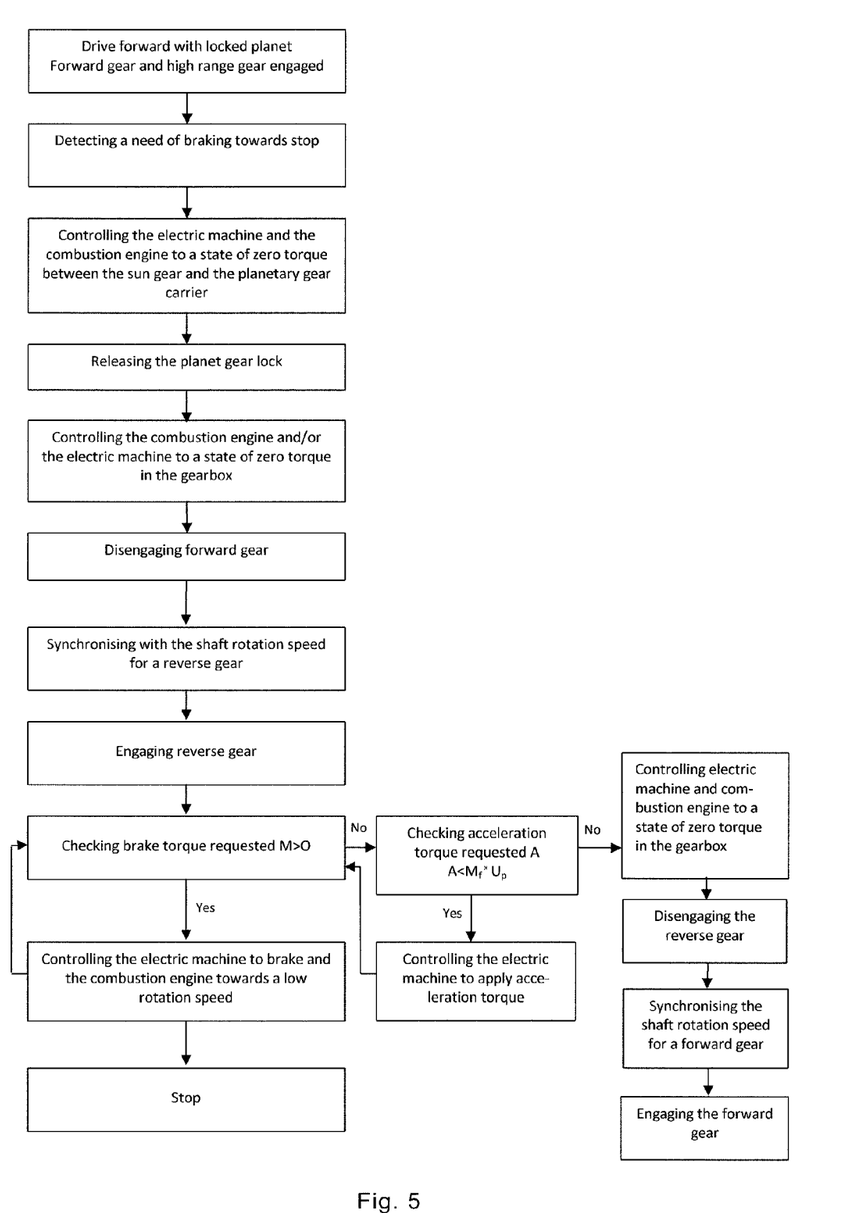
FIG. 5 is a flow chart illustrating a method according to a first embodiment of the invention.

FIG. 5 shows a flow chart illustrating a method according to a first embodiment of the present invention for braking a vehicle driving forward towards stop, in which the vehicle has a propulsion system of the type shown in FIG. 2. It is now also referred to FIG. 4, in which the development of the rotational speeds of the output shaft of the combustion engine, the input shaft of the gearbox and the rotor of the electric machine $n_1$, $n_2$ and $n_3$, respectively, and the speed v of the vehicle and the brake torque M of the electric machine are plotted versus the time for carrying out this method.

When the method is started, the vehicle is driven forward with the locking means in the locking position and a forward gear and the high range gear engaged in a range gear, not shown, of the vehicle. This means that all three components of planetary gear rotate with the same rotational speed. A need to brake the vehicle towards stop is then detected, for example for stopping the vehicle, which we here assume to be a bus, at a bus stop.

The method is then started by the control unit 21 controlling the combustion engine 2 so that a state of zero torque is obtained between the output shaft 2a of the combustion engine and the input shaft 3a of the gearbox, i.e. the components are interlocked, sun gear and planet wheel carrier, of the planetary gear. The locking means is then moved to the releasing position by displacing the coupling member 15.

The method is continued by using the control units 18 and 21 to control the electric machine 9 and the combustion engine 2, respectively, so that they deliver a state of zero torque in the gearbox 3 through the input shaft 3a of the gearbox. This may, for example, be obtained by controlling one of the electric machine and the combustion engine to transfer a zero torque to the input shaft of the gearbox and the rotational speed of the other is controlled or both are controlled to a said zero torque. When the state of zero torque is obtained in the gearbox, the existing gear in the gearbox is disengaged, i.e. the gearbox is transferred to neutral position.

The electric machine 9 and the combustion engine 2 are through the control units 18 and 21, respectively, controlled so that the rotational speed $n_3$ of the ring gear together with the rotational speed $n_1$ of the output shaft of the combustion engine give the input shaft of the gearbox a rotational speed $n_2$ which for the existing speed v of the vehicle is synchronized with the shaft rotational speed for a reverse gear of the gearbox having the high range gear engaged. By having the high range gear engaged, the reverse gear may be engaged at a speed which for a normal range gear relation is about four times as high as would instead the low range gear be engaged. Said reverse gear of the gearbox is now engaged. We have now arrived to the time $t_1$ in FIG. 4 and the method has, for example, so far taken 1-2 seconds. It is now checked how high is the brake torque requested of the propulsion system and the electric machine is controlled through the control unit 18 to apply the brake torque requested through the ring gear 11 on the input shaft of the gearbox. The output shaft of the combustion engine is simultaneously controlled towards a predetermined rotational speed in the form of a low rotational speed, such as a so-called idle rotational speed.

A reverse gear is engaged and braked by the electric machine all the way until the vehicle stands still by a full electric machine torque M. If instead a forward gear would have been chosen that would result in an increase of the rotational speed of the combustion engine to a high number of revolutions, then a high brake torque would be applied through the electric machine.

The driver of a bus discovers at the time $t_2$ that the bus should stop further ahead than the driver had planned, and checking of the brake torque requested of the propulsion system suddenly gives the result that instead of a brake torque, an acceleration torque of the propulsion system is requested. This acceleration torque is less than the product of the torque $M_f$ needed for rotating the combustion engine and the transmission ratio $U_p$ of the planetary gear. The transmission ratio of the planetary gear is the number teeth of the third component/(the number of teeth of the third component+the number of teeth of the first component). The control unit 18 does now according to the method according to the invention control the electric machine 9 to reverse the direction of the torque applied to the input shaft of the gearbox through the ring gear for applying the acceleration torque requested to this shaft.

The checking of the brake torque requested gives at the time $t_3$ again the result that a brake torque is requested, and the control unit 18 controls the electric machine to again reverse the direction of the torque M. The vehicle is then braked until it stands still at the time $t_4$ and the method is terminated. It appears that the output shaft of the combustion engine now rotates with the idle rotational speed while the rotor of the electric machine rotates in the opposite direction.

Accordingly, once the reverse gear has been engaged at the time $t_1$ the entire braking procedure until stop, including the intermediate acceleration, could be carried out without any gearchange, and it was possible to brake the vehicle by means of full torque of the electric machine for the existing rotational speed of the rotor thanks to the engagement of the reverse gear. Both these circumstances have a favorable influence upon the attempt to regenerate as much as possible of the kinetic energy of the vehicle lost during braking for storing this in the battery connected to the electric machine.

Figure 6:
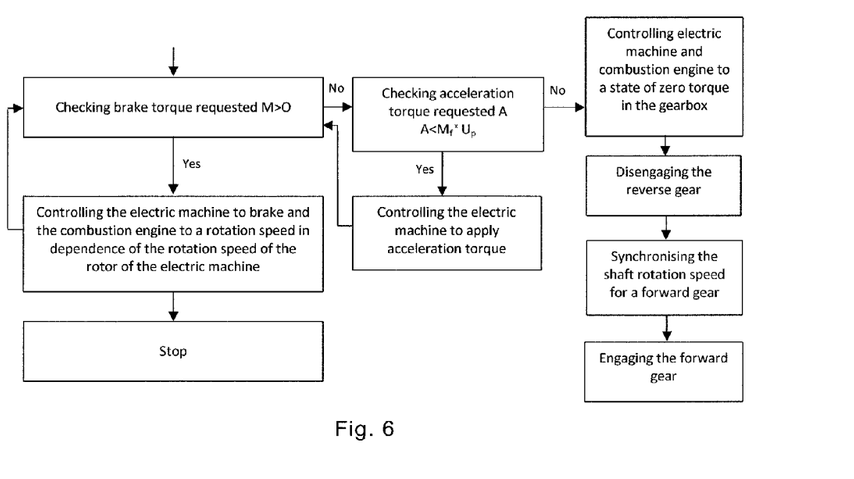
FIG. 6 is a flow chart illustrating a method according to a second embodiment of the invention.

A method according to a second embodiment of the invention is illustrated in FIG. 6, in which this embodiment differs from the one illustrated in FIG. 5 only with respect to the time after engaging a reverse gear, so that only those method steps are shown there and will now be described. The combustion engine is in this method controlled to deliver a rotational speed $n_1$ of the output shaft thereof which is so dependent on the rotational speed $n_3$ of rotor of the electric machine that the electric machine is controllable to brake the input shaft of the gearbox while generating a maximum electric regenerative power. This maximizes the power by which the electric machine may brake, since the rotational speed of the electric machine may be kept sufficiently high also at the end of the braking procedure.

A third possibility with respect to the control of the combustion engine during braking is to stop fuel injection into the combustion engine, and when the output shaft of the combustion engine substantially stands still, lock this shaft against rotation. This locking may as mentioned for example be achieved by applying a brake to the flywheel of the combustion engine, to the sun gear or to any other part being fixed with respect to rotation to the output shaft of the combustion engine. This changes to purely electric driving of the vehicle. This means then a favorable state of the drivetrain for starting driving or a short acceleration which may then be carried out with full torque of the electric machine changed up through the planetary gear.

It is in FIGS. 5 and 6 also illustrated how the method according to the invention may be interrupted, which is done in the case when checking shows that an acceleration torque is requested of the propulsion system and this torque is higher than the product of the torque needed for rotating the combustion engine and the transmission ratio of the planetary gear. The electric machine or the electric machine and the combustion engine is/are in this case controlled so that it/they, through the input shaft of the gearbox, delivers/deliver a state of zero torque in the gearbox then the reverse gear is disengaged, the electric machine and/or the combustion engine is/are controlled so that the rotational speed of the ring gear together with the rotational speed of the output shaft of the combustion engine give the input shaft of the gearbox a rotational speed which for the existing speed of the vehicle is synchronized with the shaft rotational speed for a forward gear of the gearbox, and the forward gear of the gearbox is then engaged. The method is by that terminated.

Computer program code for implementing a method according to the invention is suitably included in a computer program which is readable into an internal memory of a computer, such as the internal memory of an electronic control unit of a motor vehicle. Such a computer program is suitably provided through a computer program product comprising a non-transitory data storing medium readable by an electronic control unit, which data storing medium has the computer program stored thereon. Said data storing medium is for example an optical data storing medium in the form of a CD-ROM-disc, a DVD-disc, etc., a magnetic data storing medium in the form of a hard disc, a diskette, a tape etc., or a Flash memory or a memory of the type ROM, PROM, EPROM or EEPROM.

Figure 3:
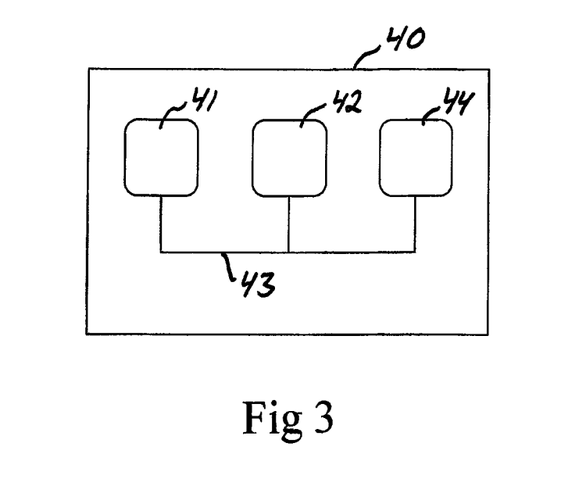
FIG. 3 is a principle sketch of an electronic control unit for implementing a method according to the invention.

FIG. 3 illustrates very schematically an electronic control unit 40 comprising an execution means 41, such as a central processor unit (CPU), for executing a computer program. The execution means 41 communicates with a memory 42, for example of the type RAM, through a data bus 43. The control unit 40 comprises also a non-transitory data storing medium 44, for example in the form of a Flash memory or a memory of the type ROM, PROM, EPROM or EEPROM. The execution means 41 communicates with the data storing medium 44 through a data bus 43. A computer program comprising computer program code for implementing a method according to the invention, for example in accordance with any of the embodiments illustrated in FIGS. 5 and 6, is stored on the data storing medium 44.

The invention is of course not in any way restricted to the embodiments described above, but many possibilities to modifications thereof would be apparent to a person with skill in the art without departing from the scope of the invention as defined in the appended claims.

The method may be applied to a vehicle without range gear, such as being common for a smaller truck.

The locking means may be designed to interlock any two of the three components.

A transmission could be arranged between the rotor and the ring gear and also between the output shaft of the combustion engine and the sun gear, such as upstream of the shaft shown in the figures to be connected to the sun gear. The transmission last mentioned could also be formed by a variable gear.

It is also conceivable that the method is carried out for a vehicle having the ring gear as the first component and the sun gear as the third component, although the opposite would probably often be preferred through the advantages thereof mentioned above.

The invention claimed is:

1. A method for braking a vehicle driving forward towards stop, wherein the vehicle comprises:
    a propulsion system comprising a combustion engine with an output shaft, a gearbox with an input shaft, an electric machine comprising a stator and a rotor, and a planetary gear comprising three components in the form of a sun gear, a ring gear and a planet wheel carrier;
    the output shaft of the combustion engine is connected to a first of the components of the planetary gear so that rotation of the output shaft causes rotation of the first component;
    the input shaft of the gearbox is connected to a second of the components of the planetary gear so that rotation of the input shaft causes rotation of the second component, and the rotor of the electric machine is connected to a third of the components of the planetary gear so that rotation of the rotor causes rotation of the third component;
    the propulsion system further comprising locking means movable between a locking position in which two of the components are interlocked, so that the three components rotate with the same rotational speed, and a releasing position, in which the components are allowed to rotate with different rotational speeds;
    the method comprises the steps of:
a) controlling the electric machine and/or the combustion engine for providing a state of zero torque between the two of the components which are interlocked by the locking means,
b) moving the locking means to the releasing position,
c) controlling the electric machine and/or the combustion engine so that through the input shaft of the gearbox, they create a state of zero torque in the gearbox,
d) then disengaging the gear presently engaged in the gearbox,
e) controlling the electric machine and/or the combustion engine so that the rotational speed of the third component together with the rotational speed of the output shaft of the combustion engine gives the input shaft of the gearbox a rotational speed which for the existing speed of the vehicle is synchronized with the shaft rotational speed for a reverse gear of the gearbox,
f) engaging the reverse gear of the gearbox,
g) checking brake torque requested of the propulsion system, and
h) controlling the electric machine to apply the brake torque requested through the third component to the input shaft of the gearbox,
    and optionally, omitting the steps a) and b) if the locking means is in the releasing position at the start of the method.

2. A method according to claim 1, wherein the vehicle has the propulsion system with the sun gear as the first component and the ring gear as the third component that is braked.

3. A method according to claim 1, performed for a vehicle having a propulsion system comprising a range gear.

4. A method according to claim 3, further comprising before performing the method, ensuring that a high range gear is engaged.

5. A method according to claim 1, further comprising performing step g) repeatedly or continuously while performing step h), and controlling the rotational speed of the output shaft of the combustion engine towards a predetermined rotational speed of the combustion engine as long as the checking indicates that brake torque is requested.

6. A method according to claim 5, further comprising controlling the output shaft of the combustion engine towards a predetermined rotational speed in the form of a low rotational speed of the combustion engine.

7. A method according to claim 1, further comprising performing step g) repeatedly or continuously while performing step h), and as long as the checking indicates that brake torque is requested, controlling the combustion engine to deliver a rotational speed of the output shaft thereof which is dependent on the rotational speed of the rotor of the electric machine such that the electric machine is during performance of step h) controllable to brake the input shaft of the gearbox while generating a maximum electric regenerative power.

8. A method according to claim 1, further comprising stopping fuel injection in the combustion engine while performing step h) and when the output shaft of the combustion engine has substantially, stopped, locking the output shaft against rotation, and continuing step h) with the combustion engine turned off.

9. A method according to claim 1, further comprising checking that steps g) and h) are performed when the checking shows that instead of a brake, torque an acceleration torque of the propulsion system is requested and the acceleration torque, is less than the product of the torque needed for driving the combustion engine to rotate and the transmission ratio of the planetary gear; and controlling the electric machine to reverse the direction of the torque applied to the input shaft of the gearbox through the third component so as to apply the acceleration torque requested to the input shaft.

10. A method according to claim 1, further comprising checking that steps g) and h) are performed, and that when the checking shows that instead of a brake torque, an acceleration torque of the propulsion system is requested and the acceleration torque is less than the product of the torque needed for driving the combustion engine to rotate and the transmission ratio of the planetary gear, controlling the electric machine or controlling the electric machine and the combustion engine so that through the input shaft of the gearbox it/they provide a state of zero torque in the gearbox, whereupon disengaging the reverse gear, controlling the electric machine and/or combustion engine so that the rotational speed of the third component together with the rotational speed of the output shaft of the combustion engine give the input shaft of the gearbox a rotational speed which, for the existing speed of the vehicle, is synchronized with the shaft rotational speed for a forward gear of the gearbox and then engaging the forward gear of the gearbox.

11. A method according to claim 1, further comprising checking that steps g) and h) are being performed, and when the checking shows that instead of a brake torque, an acceleration torque of the propulsion system is requested and the acceleration torque is larger than the product of the torque needed for driving the combustion engine to rotate and the transmission ratio of the planetary gear, controlling the electric machine or controlling the electric machine and the combustion engine so that it/they through the input shaft of the gearbox gives/give a state of zero torque in the gearbox, whereupon disengaging the reverse gear, the electric machine and/or the combustion engine is/are controlled so that the rotational speed of the third component together with the rotational speed of the output shaft of the combustion engine give the input shaft of the gearbox a rotational speed which for the existing speed of the vehicle is synchronized with the shaft rotational speed for a forward gear of the gearbox and the forward gear of the gearbox is then engaged.

12. A method according to claim 1, further comprising the step a) comprises calculating the rotational speed by which the input shaft of the gearbox is to be driven for producing a state of zero torque between the components interlocked by the locking means for the existing speed of the vehicle and the gear engaged in the gearbox;

and also comprises calculating of the rotational speeds of the output shaft of the combustion engine and the rotor of the electric machine required for obtaining the state of zero torque.

13. A method according to claim 1, further comprising the step c) comprises calculating the rotational speed by which the input shaft of the gearbox is to be driven for producing a state of zero torque in the gearbox for the existing speed of the vehicle and the gear engaged in the gearbox;

and also comprises calculating the rotational speeds of the output shaft of the combustion engine and the rotor of the electric machine required for obtaining the state of zero torque.

14. A method according to claim 1, further comprising the step e) comprises calculating the rotational speed which the input shaft ($3a$) of the gearbox would receive if, its for the existing speed of the vehicle, the reverse gear of the gearbox is engaged;

and also comprises calculating the rotational speed of the ring gear and the rotational speed of the output shaft of the combustion engine which together give the input shaft of the gearbox the rotational speed calculated for the reverse gear engaged.

15. A method according to claim 7, wherein step h) comprises calculation of the rotational speed to be assumed by the output shaft of the combustion engine for giving the electric machine a rotational speed enabling the electric machine to brake while generating a maximum regenerative power.

16. A computer program product comprising a non-transitory data storing medium readable by a computer, a computer program comprising computer program code stored on the data storing medium, and the computer program code of the computer program brings a computer to implement a method according to claim 1 when the computer program code is executed in the computer.

17. An electronic control unit of a motor vehicle comprising an execution means, a memory connected to the execution means and a non-transitory data storing medium connected to the execution means, in which a computer program code of a computer program product according to claim 16 is stored on the data storing medium.

18. A vehicle comprising an electronic control unit according to claim 17.

* * * * *